United States Patent
Yamada et al.

(10) Patent No.: US 6,790,879 B2
(45) Date of Patent: Sep. 14, 2004

(54) JET PRINTING INK AND INK-JET RECORDING METHOD

(75) Inventors: Makoto Yamada, Minami-ashigara (JP); Toshiki Fujiwara, Minami-ashigara (JP)

(73) Assignee: Fuji Photo Film Co., Ltd., Minami-ashigara (JP)

(*) Notice: Subject to any disclaimer, the term of this patent is extended or adjusted under 35 U.S.C. 154(b) by 0 days.

(21) Appl. No.: 09/409,338

(22) Filed: Sep. 30, 1999

(65) Prior Publication Data

US 2003/0065052 A1 Apr. 3, 2003

(30) Foreign Application Priority Data

Sep. 30, 1998 (JP) ............................................. 10-278023

(51) Int. Cl.[7] .......................... C09D 11/10; C08L 39/04
(52) U.S. Cl. ........................................ 523/160; 524/548
(58) Field of Search ................................ 523/160, 161; 106/31.27, 31.46, 31.47, 31.28; 524/548, 555

(56) References Cited

U.S. PATENT DOCUMENTS

| | | | | |
|---|---|---|---|---|
| 4,834,799 A | * | 5/1989 | Song ............................ | 524/236 |
| 5,019,164 A | * | 5/1991 | Tomita et al. ............... | 106/31.43 |
| 5,389,131 A | * | 2/1995 | Colt et al. .................. | 106/31.43 |
| 5,482,545 A | * | 1/1996 | Aoki et al. .................. | 106/31.43 |
| 5,665,150 A | * | 9/1997 | Schwarz ..................... | 106/31.43 |
| 5,667,572 A | * | 9/1997 | Taniguchi et al. ........... | 106/31.36 |
| 5,866,638 A | * | 2/1999 | Shimomura et al. ......... | 523/160 |
| 5,938,827 A | * | 8/1999 | Breton et al. ............... | 106/34.43 |
| 5,958,999 A | * | 9/1999 | Bates et al. .................. | 523/161 |
| 5,973,025 A | * | 10/1999 | Nigam et al. ................ | 523/160 |
| 5,990,198 A | * | 11/1999 | Schwarz, Jr. ................ | 523/160 |
| 6,001,899 A | * | 12/1999 | Gundlach et al. ........... | 523/160 |
| 6,048,389 A | * | 4/2000 | Price et al. .................. | 106/31.37 |
| 6,051,645 A | * | 4/2000 | Suzuki et al. ............... | 524/500 |
| 6,054,505 A | * | 4/2000 | Gundlach et al. ........... | 523/160 |

FOREIGN PATENT DOCUMENTS

| | | | |
|---|---|---|---|
| EP | 787778 | * | 8/1997 |
| GB | 2031448 | * | 4/1980 |
| JP | 03231975 A | * | 10/1991 |
| JP | 06184480 | * | 7/1994 |
| JP | 09059552 A | * | 3/1997 |
| JP | 11-158422 A | | 6/1999 |
| JP | 11-172183 A | | 6/1999 |

OTHER PUBLICATIONS

English Translation of JP 03231975 A.*
English Translation of JP 09059552 A.*

* cited by examiner

*Primary Examiner*—Callie Shosho
(74) *Attorney, Agent, or Firm*—Burns, Doane, Swecker & Mathis, L.L.P.

(57) ABSTRACT

An ink containing a dye and a basic polymer in an aqueous medium, in which the basic polymer has a side-chain containing a tertiary amino group, a quaternary ammonium group or a nitrogen atom-containing heterocyclic group is favorably employed in a method of forming an ink image on a receiving sheet using an ink jet printer.

6 Claims, No Drawings

JET PRINTING INK AND INK-JET RECORDING METHOD

FIELD OF MENTION

The present invention relates to a jet printing ink and an ink image-forming method using an ink jet printer.

BACKGROUND OF THE INVENTION

An ink-jet recording method has been developed and widely used because it has various merits. For example, materials for the method are available at a low cost, and high speed recording can be accomplished. Further, the method makes relatively low noise, and easily utilizable for full-color recording.

As the ink-jet recording method, three types are known. One is a method in which drops of ink are ejected under pressure by means of a piezoelectric element. In another method, bubbles are formed in ink by heating so that the bubbles would push out drops of the ink. The other is a method in which drops of ink are sucked and ejected with electrostatic force. As the ink for the method (i.e., jet printing ink), various kinds of ink such as aqueous ink, oily ink, and solid (melting) ink have been used.

Dyes used for the ink should satisfy various conditions. For example, they should be highly soluble in a solvent, and they should have excellent hues. It is also necessary for the dyes to have high resistance against light, heat, air, water and chemicals. Further, they should be well fixed onto an image-receiving sheet without blotting. They are furthermore required to have long shelf lives, to have no toxicity, to have high purity, and to be available at a low cost.

The above-mentioned requirements ought to be considered in ink-jet printing systems not only using receiving sheets designed for the specific ink-jet printing system but also using an ordinary paper sheets such as a coated paper sheet for electrostatic duplicating system or a recycled paper sheet. In more detail, it is important for ink-jet printing system that these ordinary paper sheets are employable as the image receiving sheets. Therefore, an ink-jet printing ink should form a clear image not only on a specifically designed paper sheet but also in an ordinary paper.

SUMMARY OF THE INVENTION

It is an object of the present invention to provide an improved jet printing ink and an ink-jet recording method, which forms a clear image not only on a specifically designed paper sheet but also in an ordinary paper.

It is another object of the invention to provide an improved jet printing ink which forms a clear image with good hue, high resistance to light, and fixation to a variety of paper sheets.

There is provided by the invention a jet printing ink containing a jet printing ink comprising a dye and an aqueous medium, which further comprises a basic polymer having a side-chain containing a tertiary amino group, a quaternary ammonium group, or a nitrogen atom-containing heterocyclic group.

There is further provided by the invention a method of forming an ink image on a receiving sheet using an ink jet printer of the invention.

In the invention, the basic polymer preferably contains a repeating unit of the following formula (I):

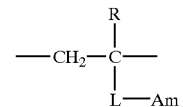

in which R is a hydrogen atom or methyl; L is a single bond, —CO—, —O—, an alkylene group, an arylene group, or a combination thereof; and Am is a tertiary amino group, a quaternary ammonium group, or a nitrogen atom-containing heterocyclic group.

Particularly preferred basic polymer has a side-chain containing a nitrogen atom-containing heterocyclic group, such as 1-imidazolyl.

The basic polymer preferably has a molecular weight (weight average molecular weight: Mw) in the range of 1,000 to 100,000, and is contained preferably in an amount of 0.1 to 50 weight %, based on the amount of ink, so that the resulting ink has a viscosity of 50 cp or lower at 25° C.

In the jet printing ink of the invention, the dye preferably is an azomethine dye or an azo dye.

DETAILED DESCRIPTION OF THE INVENTION

The characteristic feature of the invention resides in the use of a basic polymer having a specific basic group in an ink for ink-jet printing system. In more detail, it is known that a jet-printing ink should have a low viscosity, because it should be ejected the form of drops through a nozzle. Therefore, those skilled in the art have not considered to incorporate a polymer into a jet-printing ink, which likely brings about viscosity increase of the ink.

The present inventors have tried to use a basic polymer which has been known as a mordant polymer (described in Japanese Patent Provisional Publication H10-217597) in a jet-printing ink for improving compatibility between a jet-printing ink and a variety of ordinary paper sheets. The trial has been so successful that a clear ink image is formed on ordinary paper sheets (which are not specifically designed for the use in jet-printing systems) using an ink containing the specifically selected basic polymer, which has been know only as a mordant polymer for photographic materials. No adverse effect on the ejection of an ink from the nozzle has been observed, notwithstanding the incorporation of a polymer martial in the ink;

The basic polymer to be incorporated in the jet-printing ink of the invention has a side-chain which contains a tertiary amino group, a quaternary ammonium group, or a nitrogen atom-containing heterocyclic group.

The tertiary amino group can be represented by the formula of —NR$_2$, in which R is an alkyl group, a substituted awl group, an alkenyl group, a substituted alkenyl group, an alkynyl group, a substituted alkynyl group, an aryl group, or a substituted aryl group. Preferred are an alkyl group, a substituted alkyl group, an alkenyl group, a substituted alkenyl group, an alkynyl group, and a substituted alkynyl group. More preferred are an alkyl group, a substituted alkyl group, an alkenyl group, and a substituted alkenyl group. Most preferred are an alkyl group and a substituted alkyl group. Particularly preferred is an alkyl group. In the formula of —NR$_2$, one R is the same as or different from another R.

The alkyl group preferably has a linear or branched chain structure, but may have a cyclic structure. The alkyl group preferably has 1 to 20 carbon atoms, more preferably 1 to 15 carbon atoms, further preferably 1 to 12 carbon atoms, and most preferably 1 to 10 carbon atoms.

The substituted alkyl group has an alkyl moiety mentioned above and one or more substituents such as hydroxyl, cyano and aryl.

The alkenyl group preferably has a linear or branched chain structure, but may have a cyclic structure. The alkenyl group preferably has 2 to 20 carbon atoms, more preferably 2 to 15 carbon atoms, further preferably 2 to 12 carbon atoms, and most preferably 2 to 10 carbon atoms.

The substituted alkenyl group has an alkenyl moiety mentioned above and one or more substituents such as hydroxyl, cyano and aryl.

The alkynyl group preferably has a linear or branched chain structure, but may have a cyclic structure. The alkynyl group preferably has 2 to 20 carbon atoms, more preferably 2 to 15 carbon atoms, further preferably 2 to 12 carbon atoms, and most preferably 2 to 10 carbon atoms.

The substituted alkynyl group has an alkynyl moiety mentioned above and one or more substituents such as hydroxyl, cyano and aryl.

The quaternary ammonium group can be represented by the formula of $-N^+R_3$, in which R is a hydrogen atom, an alkyl group, a substituted alkyl group, an alkenyl group, a substituted alkenyl group, an alkynyl group, a substituted alkynyl group, an aryl group, or a substituted aryl group. Preferred are an alkyl group, a substituted alkyl group, an alkenyl group, a substituted alkenyl group, an alkynyl group, and a substituted alkynyl group. More preferred are an alkyl group, a substituted alkyl group, an alkenyl group, and a substituted alkenyl group. Most preferred are an alkyl group and a substituted alkyl group. Particularly preferred is an alkyl group. In the formula, three R are the same as or different from each other.

Examples of the alkyl grips, substituted alkyl groups, alkenyl groups, substituted alkenyl groups, alkynyl groups, and substituted alkynyl groups are those described above for R of the tertiary amino group.

The quaternary ammonium group may have an anion such as a halide ion or a sulfonate ion, as a counter ion.

The heteorcyclic ring of the nitrogen atom-containing heterocyclic group preferably is a five- or six-membered ring, particularly a five-membered ring. The heterocyclic ring may contain a hetero atom other than the nitrogen atom, for instance, an oxygen atom or a sulfur atom. However, a heterocyclic ring containing only a nitrogen atom as the hetero atom is preferred. The heterocyclic ring preferably is an unsaturated heterocyclic ring but may be a saturated heterocyclic ring. Most preferred is an unsaturated heterocyclic ring containing a double bond as much as possible. The five- or six-membered heterocyclic ring preferably contains one or two nitrogen atoms. Most preferred nitrogen atom-containing heterocyclic ring is an imidazole ring, particularly 1-imidazolyl.

The nitrogen atom contained in the heterocyclic ring may be in the form of an ammonium ion, which may have an anion such as a halide ion or a sulfonate ion, as a counter ion.

The basic polymer preferably contains a repeating unit of the following formula (I):

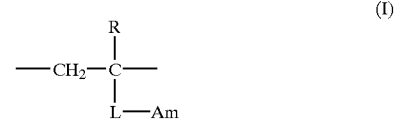

in which R is a hydrogen atom or methyl; L is a single bond, —CO—, —O—, an alkylene group, an arylene group, or one of their combinations such as -arylene-alkylene-, and —CO—O-alkylene- (the left end is attached to the main chain and the right end is attached to Am); and Am is a tertiary amino group, a quaternary ammonium group, or a nitrogen atom-containing heterocyclic group, such as those described hereinbefore.

Examples of the repeating units of the formula (I) are illustrated below:

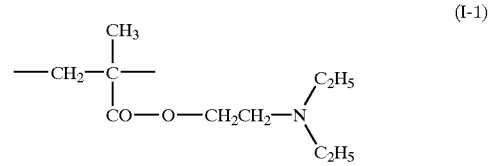

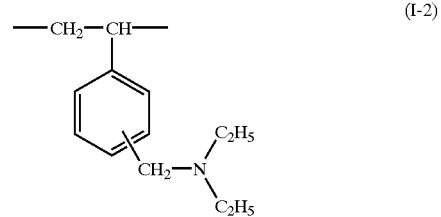

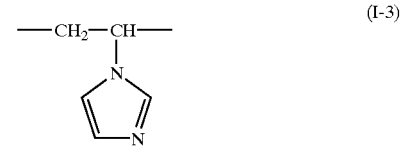

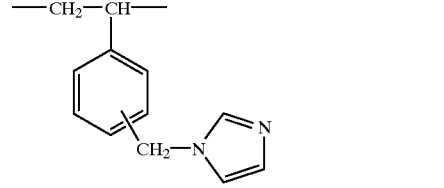

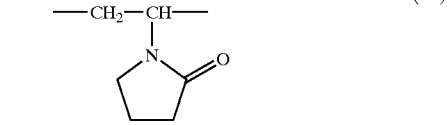

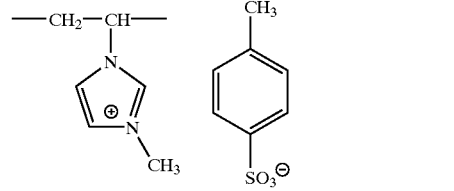

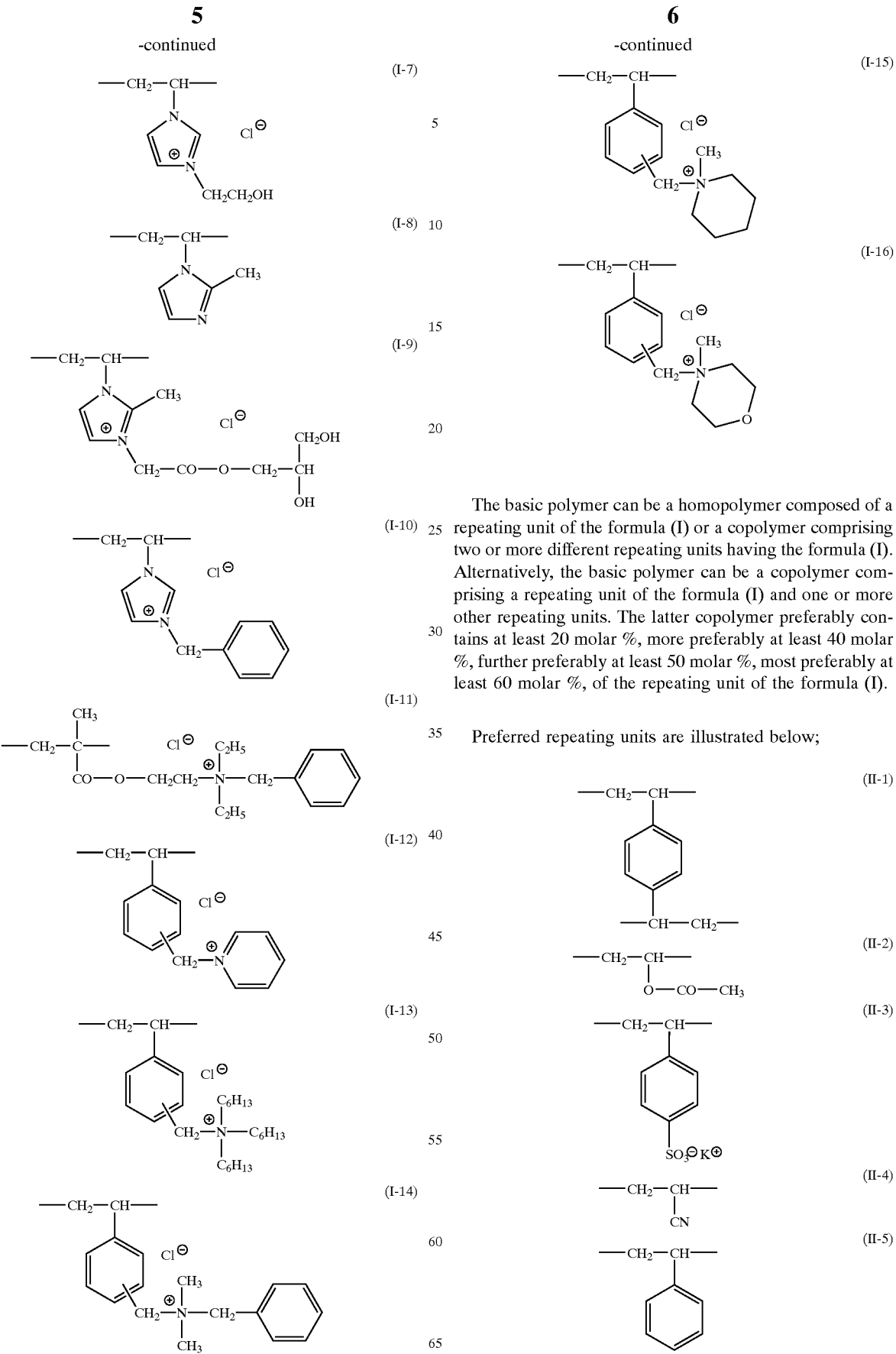

The basic polymer can be a homopolymer composed of a repeating unit of the formula (I) or a copolymer comprising two or more different repeating units having the formula (I). Alternatively, the basic polymer can be a copolymer comprising a repeating unit of the formula (I) and one or more other repeating units. The latter copolymer preferably contains at least 20 molar %, more preferably at least 40 molar %, further preferably at least 50 molar %, most preferably at least 60 molar %, of the repeating unit of the formula (I).

Preferred repeating units are illustrated below;

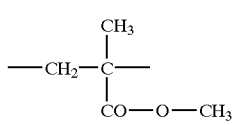

(II-6)

Examples of the basic polymers are listed below:
A-1: -(I-1)$_{100}$-
A-2: -(I-2)$_{100}$-
A-3: -(I-3)$_{90}$-(II-1)$_{10}$-
A-4: -(I-3)$_{100}$-
A-5: -(I-4)$_{100}$-
A-6: -(I-3)$_{50}$-(I-5)$_{50}$-
A-7: -(I-3)$_{50}$-(II-2)$_{50}$-
A-8: -(I-3)$_{75}$-(II-3)$_{25}$-
A-9: -(I-3)$_{60}$-(I-5)$_{30}$-(II-3)$_{10}$-
A-10: -(I-3)$_{60}$-(II-4)$_{40}$-
A-11: -(I-4)$_{80}$-(II-5)$_{15}$-(II-1)$_{5}$-
A-12: -(I-6)$_{100}$-
A-13: -(I-7)$_{100}$-
A-14: -(I-3)$_{90}$-(I-7)$_{10}$-
A-15: -(II-6)$_{50}$-(I-8)$_{25}$-(I-9)$_{25}$-
A-16: -(II-5)$_{50}$-(I-3)$_{35}$-(I-10)$_{15}$-
A-17: -(I-11)$_{100}$-
A-18: -(I-12)$_{100}$-
A-19: -(I-13)$_{100}$-
A-20: -(I-14)$_{47.5}$-(II-5)$_{47.5}$-(II-1)$_{5}$-
A-21: -(I-15)$_{47.5}$-(II-5)$_{47.5}$-(II-1)$_{5}$-
A-22: -(I-16)$_{95}$-(II-1)$_{5}$-
A-23: -(I-3)$_{70}$-(I-5)$_{30}$-
A-24: -(II-5)$_{50}$-(I-3)$_{35}$-(I-10)$_{15}$-

Two or more basic polymers can be employed in combination.

The basic polymer preferably has a mean molecular weight (Mw) in the range of 1,000 to 100,000, more preferably 5,000 to 50,000.

The basic polymer employed in the invention is known as a polymer mordant. Example of the known basic polymer having the formula (I) are given below:

Polymer mordants having a tertiary imidazole ring are described in U.S. Pat. Nos. 4,282,305, 4,115,124, and 3,148,061, and Japanese Patent Provisional Publications No. 60-118834 and No. 60-122941;

Polymer mordants having a quaternary imidazoline group are described in British Patents No. 2,056,101, No. 2,093,041, and No. 1,594,961, U.S. Pat. Nos. 4,124,386, 4,115,124, 4,273,853, and 4,450,224, and Japanese Patent Provisional Publication No. 48-28325;

Polymer mordants having a quaternary ammonium group are described in U.S. Pat. Nos. 3,709,690, 3,898,088, and 3,958,995, and Japanese Patent provisional Publications No. 60-57836, No. 60-60643, No. 60-122940, No. 60-122942, and No. 60-235134;

Polymer mordants having a pyridine ring or a pyridinium group are described in U.S. Pat. Nos. 2,548,564, 2,484,403, 3,148,161, and 3,756,814;

Polymer mordants which can form a cross-link with gelatin are described in U.S. Pat. Nos. 3,625,694, 3,859,096, and 4,128,538, and British Patent No. 1,277,453;

Aqueous sol mordants are described in U.S. Pat. Nos. 2,721,852, 2,798,063, and 3,958,995, and Japanese Patent Provisional Publications No. 54-26027, No. 54-115228, and No. 54-145529;

Reactive mordants having a covalent bond with a dye are described in U.S. Pat. No. 4,168,976 and Japanese Patent Provisional Publication 54-137333; and Other polymer mordants are described in U.S. Pat. Nos. 2,675,316, 2,882,156, 3,271,147, 3,271,148, 3,488,706, 3,557,066, 3,642,482, 3,709,1690, and 3,788,855, and Japanese Patent Provisional publications No. 50-71332, No. 53-30328, No. 52-155528, No. 53-125, and No. 53-1024.

The basic polymer is preferably contained in the jet-printing ink in an amount of 0.1 to 50 weight %, more preferably 0.1 to 20 weight %. The basic polymer is preferably used in the range of 0.1 to 10 moles (in terms of the basic functional group such as the tertiary amino group, quaternary ammonium group, or the nitrogen atom-containing heterocyclic group), more preferably 1 to 50 moles, based on one mole of the dye.

The jet-printing ink of the invention containing the basic polymer preferably has a viscosity of 50 cp or less (measured at 25° C.), more preferably 20 cp or less.

The jet-printing ink further contains a dye. The basic polymer of the invention is preferably employed in combination with an azomethine dye or an azo dye. The azomethine dye has a basic structure of heterocyclic ring =N-aromatic ring, and the azo dye has a basic structure of heterocyclic ring (or an aromatic ring) —N=N-aromatic ring.

Preferred examples of the azomethine dyes are those having the formulas (II) and (IV) which are illustrated below:

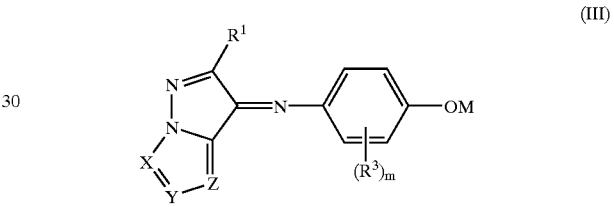

(III)

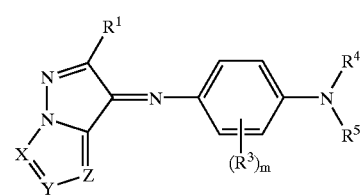

(IV)

In the formulas (III) and (IV), each of $R^1$ and $R^3$ independently is a hydrogen atom, a halogen atom an alkyl group, a cycloalkyl group, an aralkyl group, an aryl group, a heterocyclic group, an alkoxy an aryloxy group, cyano, amido, sulfonamido, ureido, an alkoxycarbonylamino soup, an alkylthio group, an arylthio sop, an alkoxycarbonyl group, a carbamoyl group, a sulfamoyl group, a sulfonyl group, an acyl group, an amino group, or an alkylamino group. The benzene ring contained in these groups may have one or more substituents selected from the group consisting of halogen, alkyl, cycloalkyl, aralkyl, aryl, heterocylic ring, alkoxy, aryloxy, cyano, amido, sulfonamido, ureido, alkoxycarbonylamino, alkylthio, arylthio, alkoxycarbonyl, carbamoyl, sulfamoyl, sulfonyl, acyl, amino and alkylamino.

In the formulas (III) and (IV), m is 0, 1, 2, 3, or 4. If m is a plural number, plural R can be the same as or different from each other. Each of X, Y and Z independently is =N— or =CR$^2$—, in which R$^2$ is hydrogen, alkyl, cycloalkyl, aralkyl, aryl, heterocyclic ring, alkoxy, or aryloxy. In the case that both of X and Y are =CR$^2$—, these two R$^2$ can be combined to form a ring.

In the formula (III), M is a hydrogen atom, a dissociated inorganic base, a primary amine, a secondary amine, or a tertiary amine.

In the formula (IV), each of $R^4$ and $R^5$ independently is a hydrogen atom, an alkyl, a cycloalkyl group, an alkyl group, or an aryl group. Otherwise, $R^4$ and $R^5$ can be combined to form a ring. A set of $R^3$ and $R^4$, and a set of $R^3$ and $R^5$ can be coined to form a ring.

The azornethine dye of the formula (III) or (IV) preferably has a strongly hydrophilic group such as sulfo, as the substituent group. The sulfo is preferably dissociated, and mare preferably in the form of a salt. A counter ion to the sulfo to form a salt preferably is an alkali metal ion.

Preferred examples of the azo dyes are those having the formulas (V) and (VI) which are illustrated below:

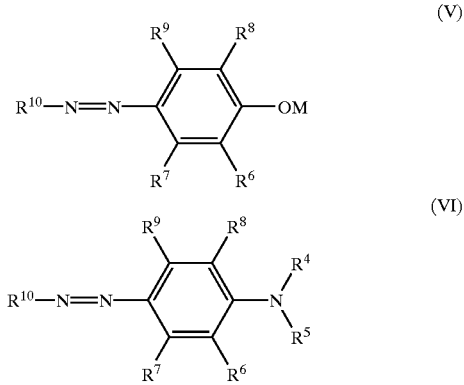

In the formulas (V) and (VI), each of $R^6$, $R^7$, $R^8$ and $R^9$ independently is a hydrogen atom, a halogen atom, an alkyl group, a cycloalkyl group, an aralkyl group, an aryl group, a heterocyclic group, cyano, hydroxyl, nitro, amino, an alkylamino, an alkoxy group, an aryloxy group, amido, an arylamino group, ureido, sulfamoylamino, an alkylthio group, an arylthio group, an alkoxycarbonyl group, a heterocyclic ring-oxy group, an azo group, an acyloxy group, a carbamoyloxy group, a silyloxy group, an aryloxycarbonyl group, an aryloxycarbonylamino group, an imido group, a heterocyclic ring-thio group, sulfinyl, phosphoryl, an acyl group, carboxyl or sulfo. $R^8$ and $R^9$ are combined to form an aromatic ring or a heterocyclic ring.

In the formulas (V) and (VI), $R^{10}$ is an unsaturated heterocyclic rig, which preferably is a five- or six-membered ring. The five-membered ring is most preferred. The unsaturated heterocyclic ring preferably has a double bond as much as possible. As the hetero atom, nitrogen, oxygen or sulfur is preferred, and nitrogen and sulfur are specifically preferred. The unsaturated heterocyclic ring may be fused with a benzene ring or other heterocyclic rings.

In the formula (V), M is a hydrogen atom, a dissociated inorganic base, a primary amine, a secondary amine, or a tertiary amine.

In the formula (VI), each of $R^4$ and $R^5$ independently is a hydrogen atom, an alkyl group, a cycloalkyl group, an aralkyl group, or an aryl group. Otherwise, $R^4$ and $R^5$ can be combined to form a ring. A set of $R^3$ and $R^4$, and a set of $R^3$ and $R^5$ can be combined to form a ring.

The azo dye of the formula (V) or (VI) preferably has a strongly hydrophilic group such as sulfo, as the substituent group. The sulfo is preferably dissociated, and more preferably in the form of a salt. A counter ion to the sulfo to form a salt preferably is an alkali metal ion.

Examples of the azomethine dyes and azo dyes are further described below:

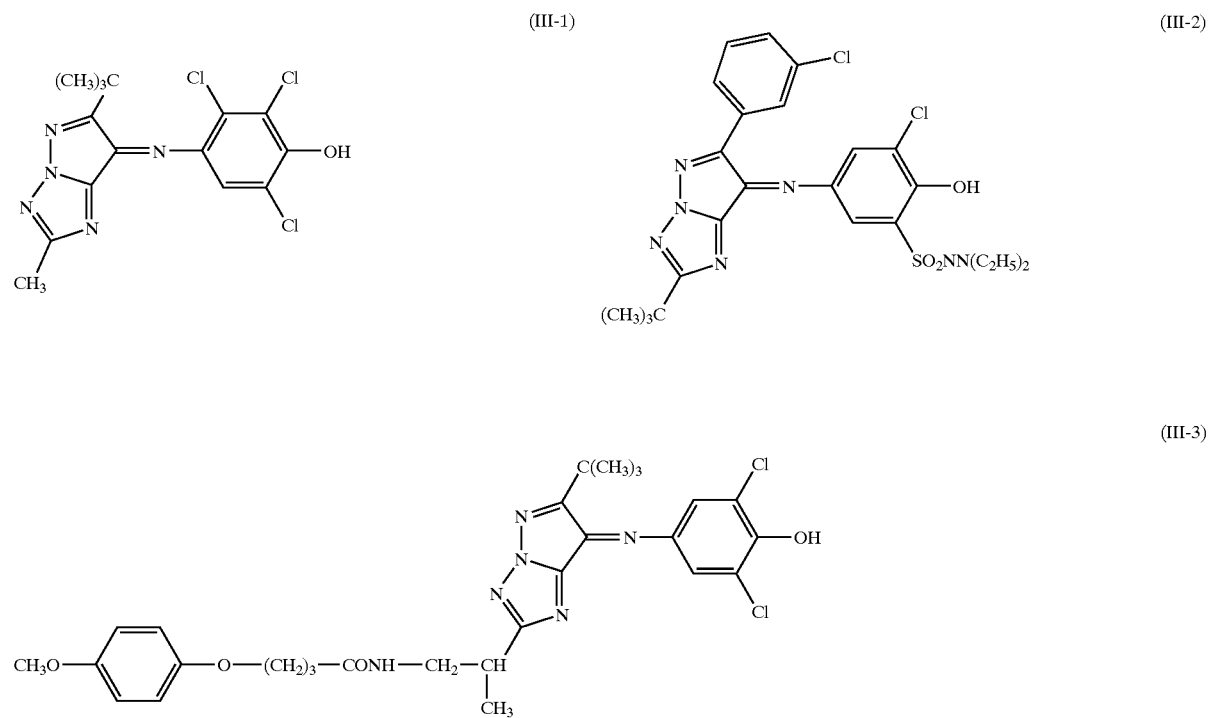

-continued
(III-4)
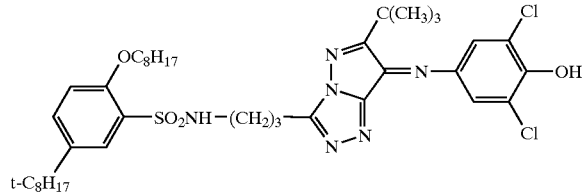
(III-5)
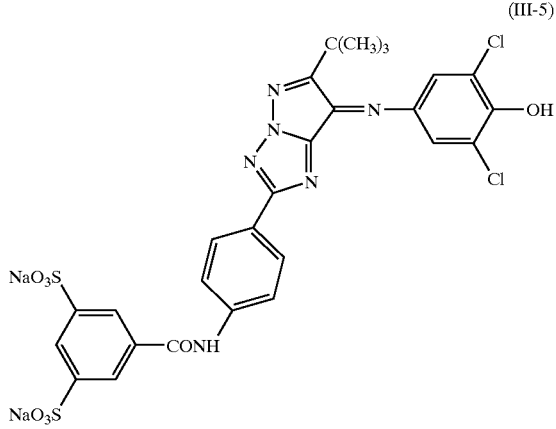
(III-6)
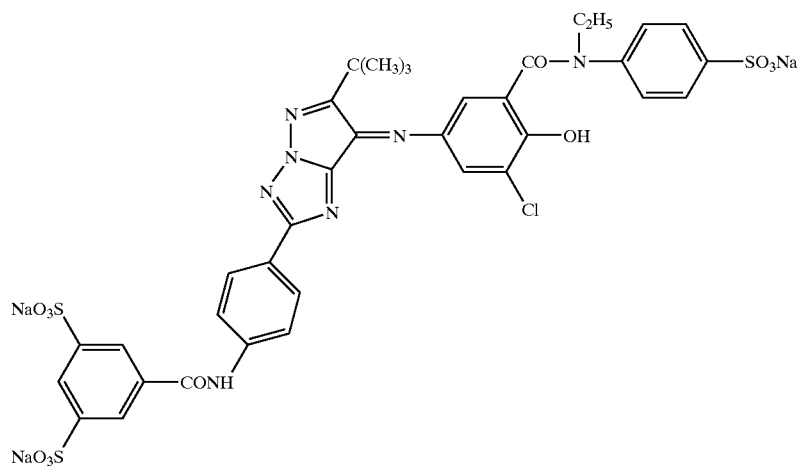
(III-7)
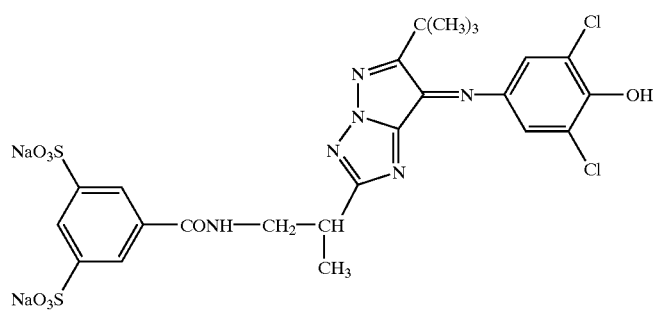
(III-8)
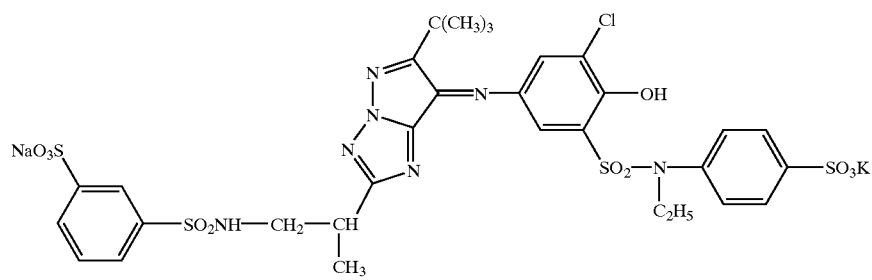

(III-9)
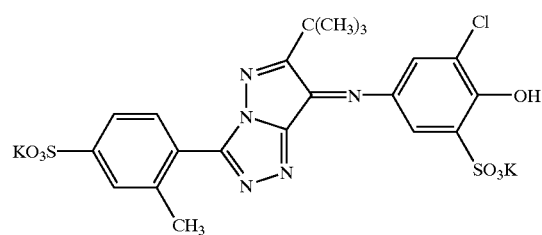
(III-10)
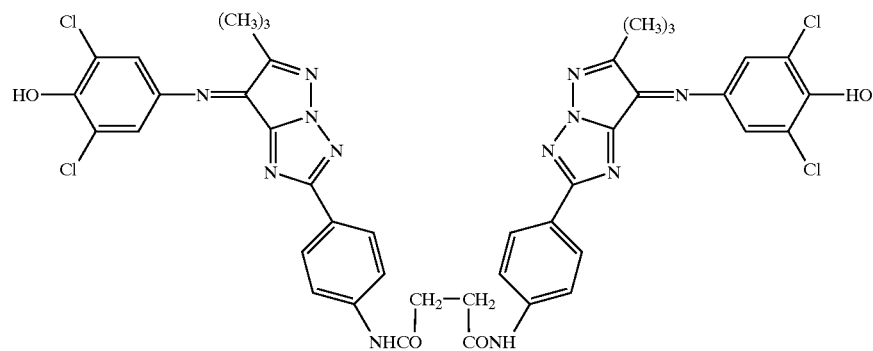
(III-11)
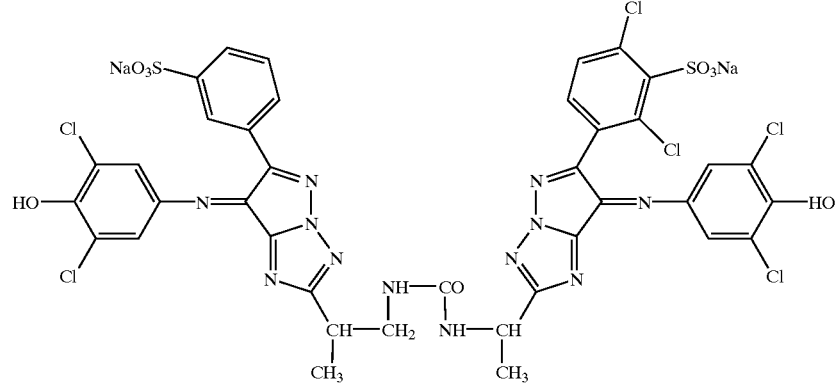
(IV-1)
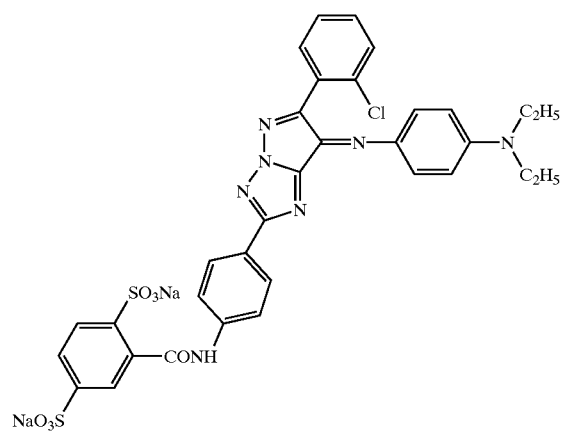
(IV-2)
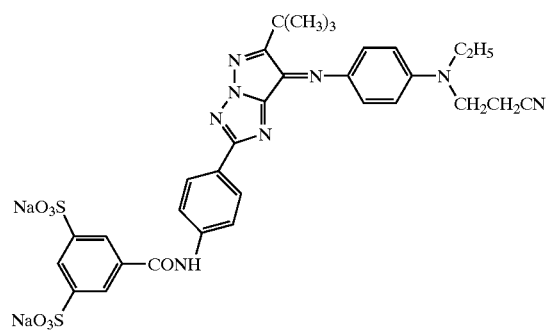

-continued
(IV-3)
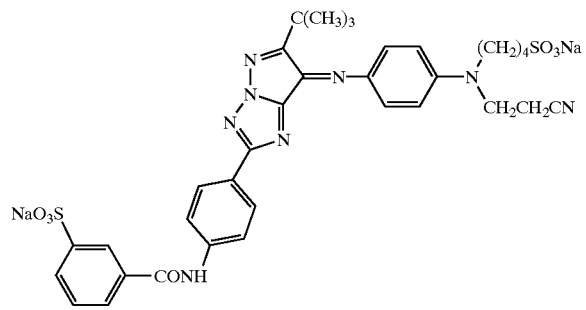
(IV-4)
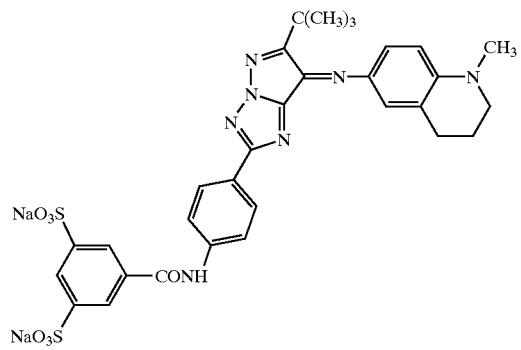
(IV-5)
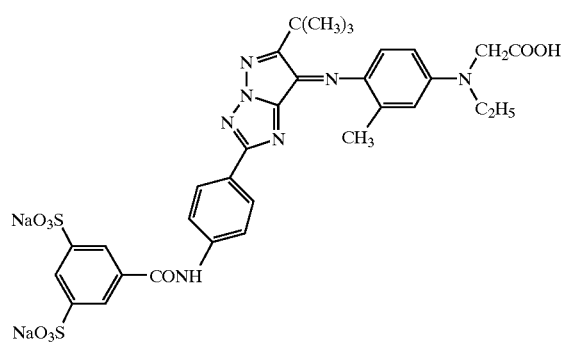
(IV-6)
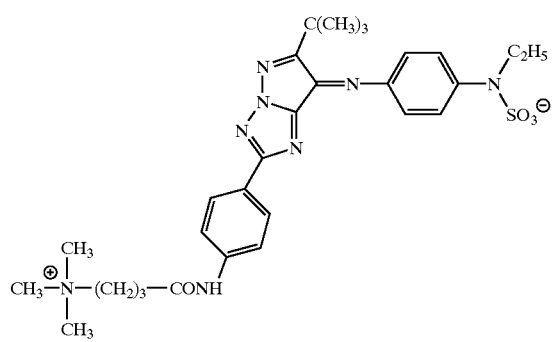
(IV-7)
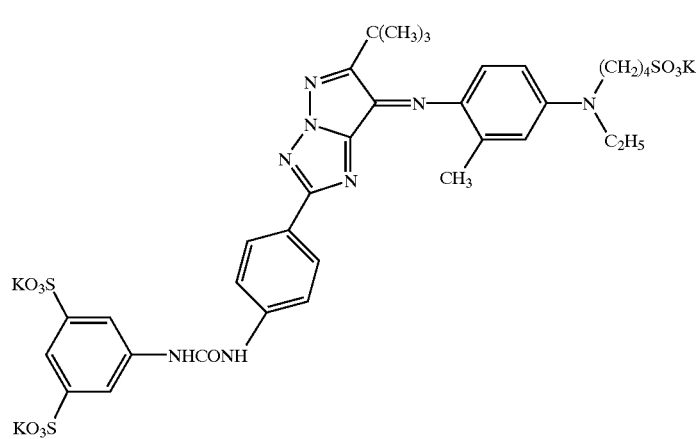
(IV-8)
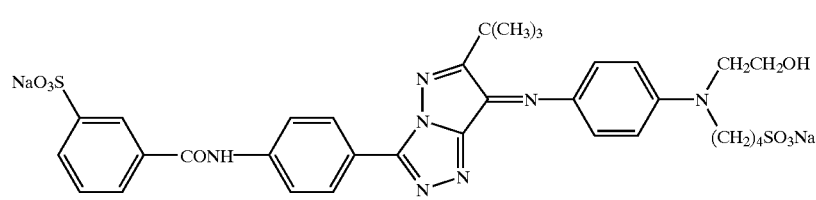

-continued
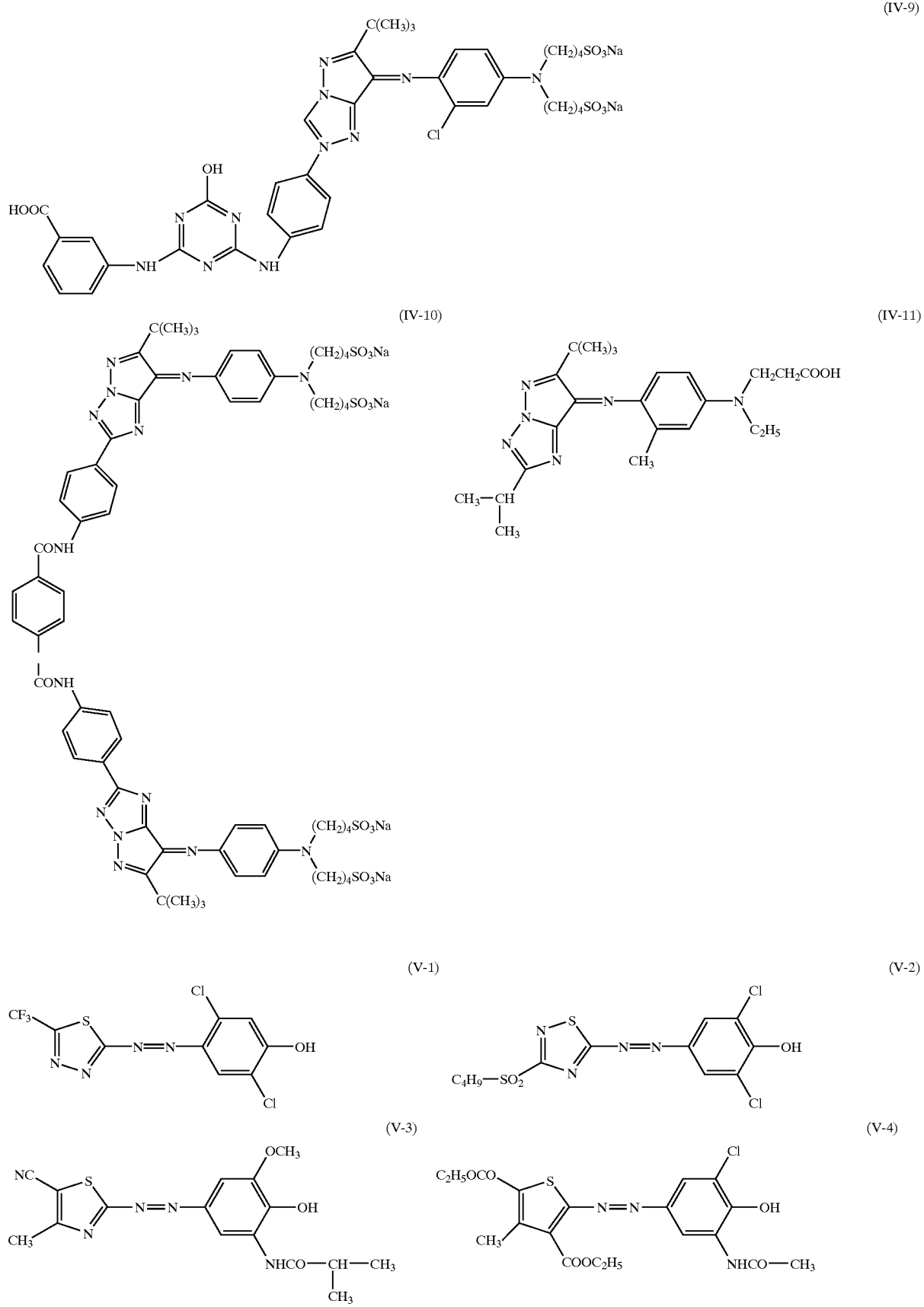

-continued
(V-5)
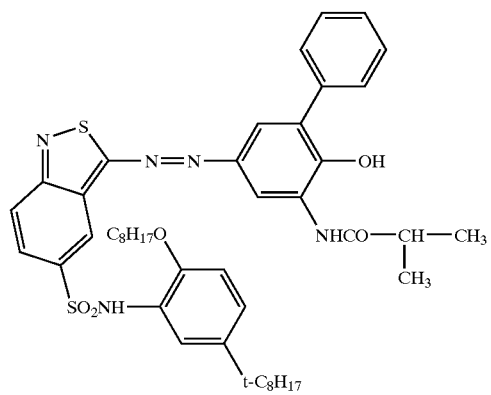
(V-6)
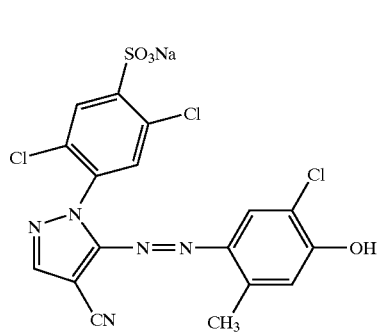
(V-7)
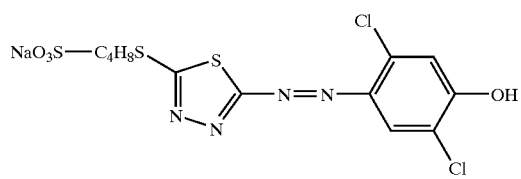
(V-8)
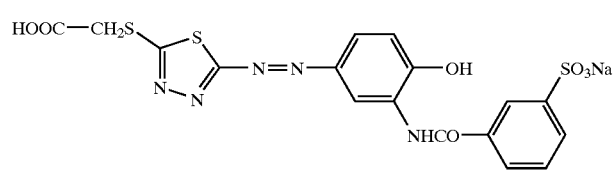
(V-9)
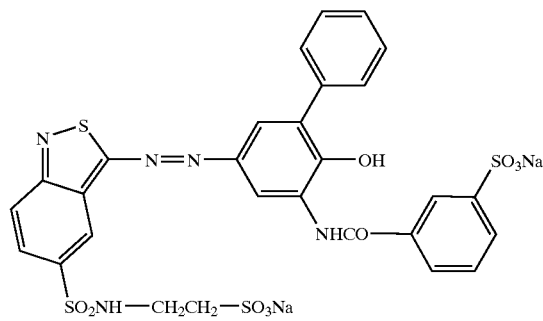
(V-10)
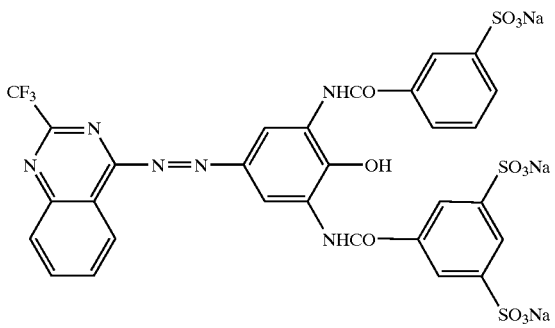
(V-11)
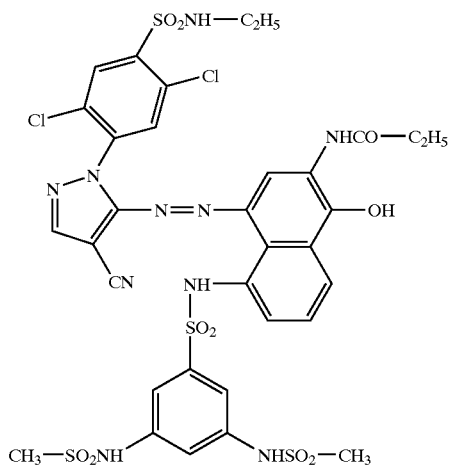
(V-12)
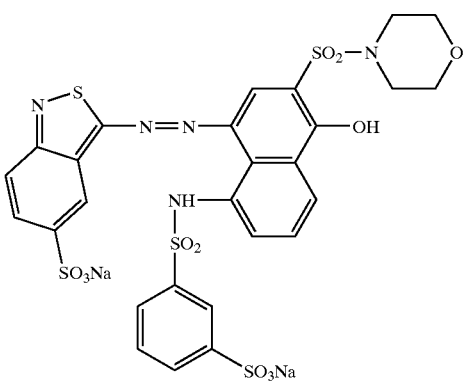

-continued
(V-13)
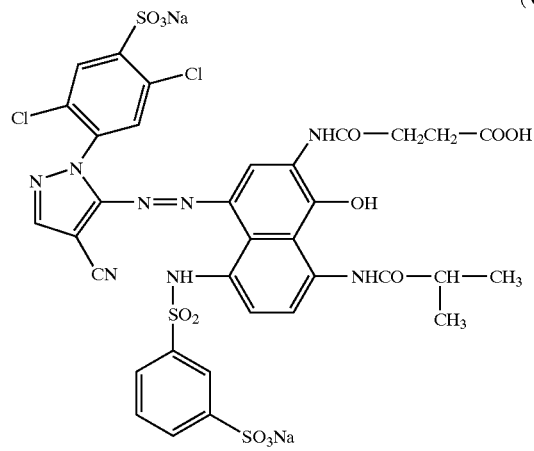
(V-14)
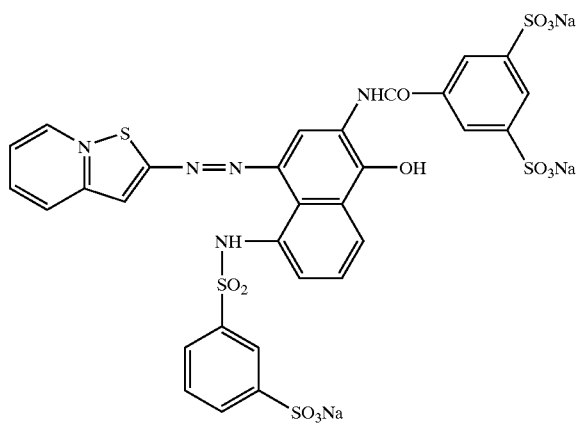
(V-15)
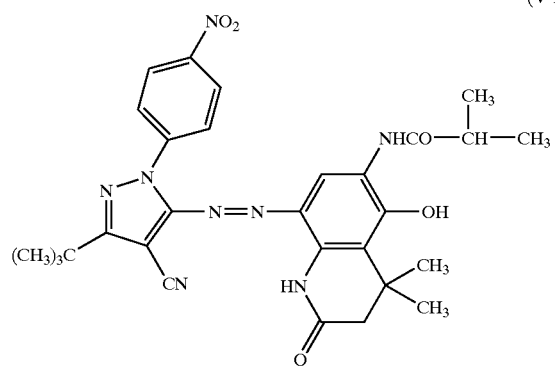
(VI-1)
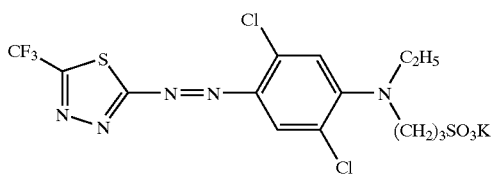
(VI-2)
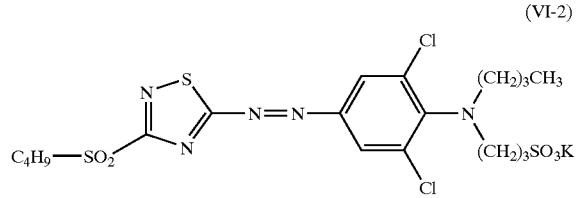
(VI-3)
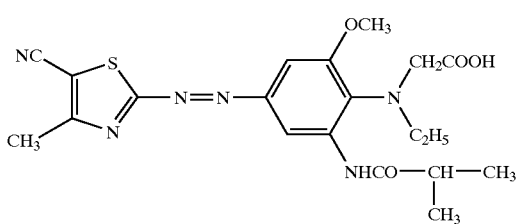
(VI-4)
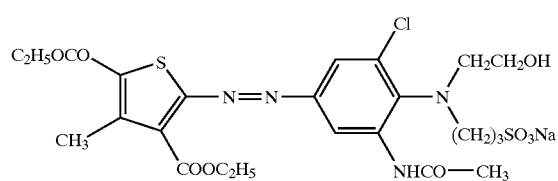
(VI-5)
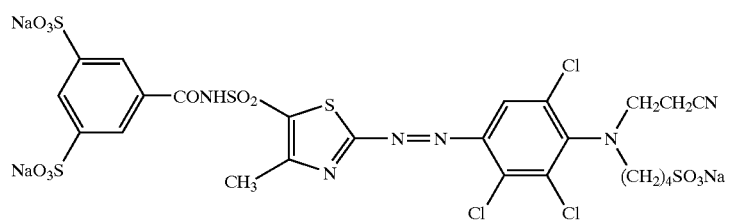

-continued
(VI-6)
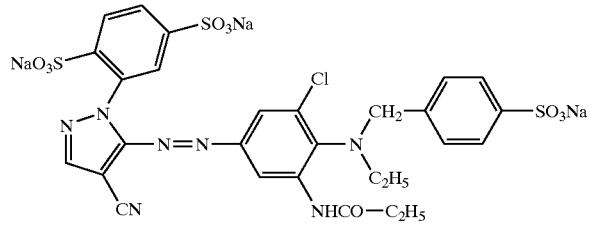
(VI-7)
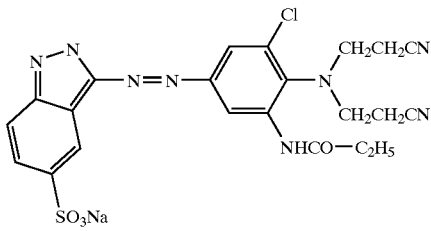
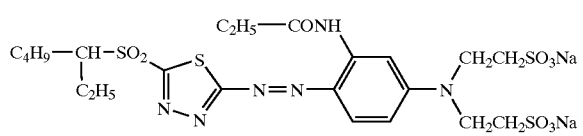
(VI-8)
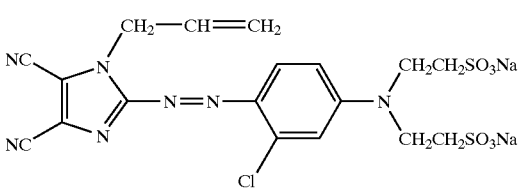
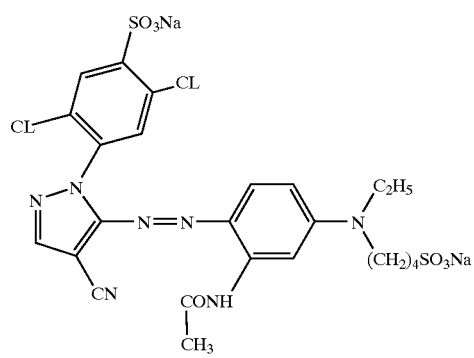
(VI-11)
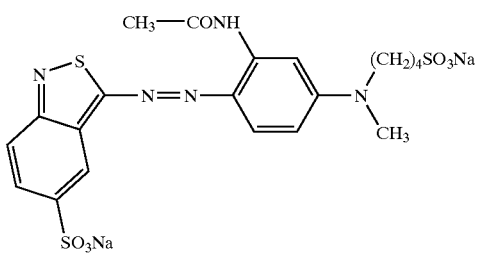
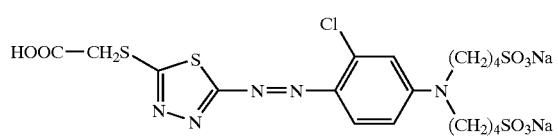
(VI-13)
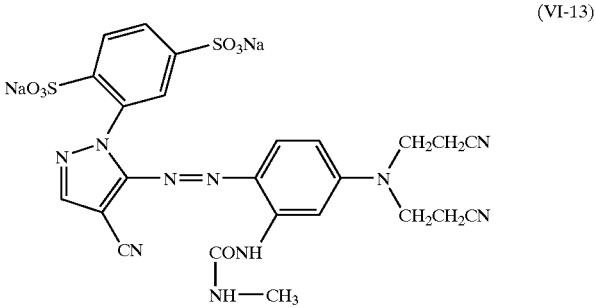
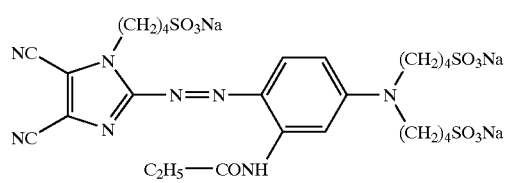
(VI-14)
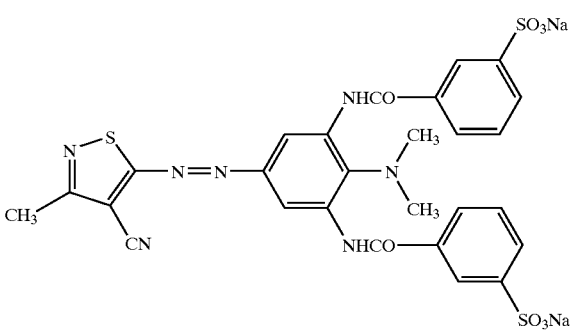

The azomethine dye and azo dye are described in Japanese Patent Provisional Publications No. H11-l58422 and No. H1-172183.

Two or more azomethine dyes and/or azo dyes can be employed in combination. The azomethine dye and azo dye can be used in combination with one or more other dyes. The azomethine dye and azo dye shows a hue of magenta or cyan. Therefore, a combination of the azomethine dye or azo dye with a dye giving a yellow hue such as that described in Japanese Patent Provisional Publication No. H10-95942 is preferably employed for preparing a color image.

In the ink, the dye is preferably contained in an amount of 0.1 to 30 weight %.

The medium of aqueous ink is an aqueous medium, such as water or a mixture of water and an organic solvent compatible with water. Examples of the water-compatible organic solvents include alcohols (e.g., methanol, ethanol, propanol, isopropanol, butanol, iso-butanol, sec-butanol, t-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentane diol, glycerol, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ehter, propylene glycol monomethyl ether, propylene glycol monobutyl ether, dipropylene glycol monomethyl ether, triethylene glycol ethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethazolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, and 1,3-dimethyl-2-imidazolidinone, acetonitrile, acetone).

Two or more kinds of water-compatible organic solvents may be used in combination with water.

The dye may be dissolved or dispersed in an aqueous solvent (i.e., water or a mixture of water and a water-compatible organic solvent) to prepare aqueous ink. For dispersing, the dye is preferably made to be in the form of fine particles by means of a dispersing machine (e.g., ball mill, sand mill, attriter, roll mill, agitator mill, Henschek mixer, colloid mill, ultrasonic homogenizer, pearl mill, jet mill, ong mill). The dye may be dissolved in an organic solvent, and then the solution may be emulsified in an aqueous solution. For emulsifying, dispersing agents (emulsifiers) or surface active agents can be used. The preparation method of aqueous jet printing ink is described in Japanese Patent Provisional Publications No. H5-148436, No. H5-295312, No. H7-97541, No. H7-82515, and No. H7-118B54.

Examples of the organic solvents include alcohols (e.g., ethanol, pentanol, heptanol, cyclohexanol, benzyl alcohol, phenethyl alcohol, plenylpropyl alcohol, furfuryl alcohol, and anise alcohol), glycohols (e.g., ethylene glycol monoethyl ether, ethylene glycohol monophenyl ether, diethylene glycol monoethyl ether, diethylene glycol monobutyl ether, propylene glycol monoethyl ether, propylene glycol monophenyl ether, dipropylene glycol monomethyl ether, dipropylene glycol monoethyl ether, triethylene glycol monoethyl ether, ethylene glycol diacetate, ethylene glycol monoethyl ether acetate, and propylene glycol diacetate), ketones (e.g., benzyl methyl ketone, diacetone alcohol, and cyclohexanone), ethers (e.g., butyl phenyl ether, benzyl ethyl ether, and dihexyl ether), esters (e.g., ethyl acetate, amyl acetate, benzyl acetate, phenylethyl acetate, phenoxyethyl acetate, ethyl phenylacetate, benzyl propionate, ethyl benzoate, butyl benzoate, ethyl laureate, butyl laureate, isopropyl myristate, isopropyl palmitate, triethyl phosphate, tributyl phosphate, diethyl phthalate, dibutyl phthalate, diethyl malonate, dipropyl malonate, diethylmalonate diethyl succinate, dibutyl succinate, diethyl glutarate, diethyl adipate, dibutyl adipate, di-2-methoxyethyl adipate, diethyl sebacate, diethyl maleate, dibutyl maleate, dioctyl maleate, diethyl fumarate, dioctyl fumarate, and 3-hexenyl cinnamate), hydrocarbon solvents (e.g., petroleum ether, petroleum benzin, tetralin, decalin, 1-amylbezene, and dimethylnaphthalene), and other polar solvents (e.g., acetonitrile, formamide, N,N-dimethylformamide, N,N-dimethylacetamide, dimethylsulfoxide, sulfolane, propylene carbonate, N-methyl-2-pyrrolidone, N-vinyl-2-pyrrolidone, and N, N-diethyl-dodecanamide. Two or more organic solvents can be employed in combination.

In the jet printing ink, various additives can be contained, if desired. Examples of the additives include viscosity controlling agent, surface tension controlling agent, specific resistance controlling agent, film-formation controlling agent, UV absorber, anti-oxidizing agent, anti-fading agent, antifungal agent, rust inibitor, dispersing agent, and surface active agent. Additives for the jet printing ink are described in Japanese Patent Provisional Publication No. H10-95942. The anti-fading agent and UV absorber are described in Japanese Patent Provisional Publications No. H1-13546, No. H1-159655, and No. H1-171887.

The jet-printing ink preferably has a surface tension in the range of 20 to 100 dyn/cm.

For forming a full-color image, inks of magenta, cyan and yellow hues can be used. Further, ink of black hue can be used to control the hues of the image.

As recording paper (image-receiving sheet) for ink-jet printing, coat paper is preferred from the viewpoints of image quality and storing durability of image.

The image-receiving sheet for ink-jet recording may contain an inorganic pigment. Examples of the inorganic pigment include silica pigment, alumina pigment, titanium dioxide pigment, zinc oxide pigment, zirconium oxide pigment, mica-shaped iron oxide, white lead, lead oxide pigment, cobalt oxide pigment, strontium chromate, molybdenum pigments, smectites, magnesium oxide pigment, calcium oxide pigment, calcium carbonate pigment, and mullite. Two or more pigments may be used in combination.

The image-receiving sheet preferably comprises a hydrophilic layer (an ink-receiving layer) containing a hydrophilic binder, The binder preferably is a water absorptive polymer. Examples of the hydrophilic binders include gelatin, gelatin derivatives, polyvinyl alcohol, polyvinyl alcohol derivatives, polyalkyleneoxide, and polyalkyleneoxide derivatives. The hydrophilic binder is described in Japanese Patent Provisional Publication No. H1-161236, pp. 215–222.

The image-receiving material preferably contains a matting agent. The matting agent is described in Japanese Patent Provisional Publication No. H1-161236, pp. 263–264.

The ink-receiving layer in the image-receiving sheet is preferably hardened by a curing agent. The curing agent is described in Japanese Patent Provisional Publication No. H1-161236, pp.222.

The layers constituting the image-receiving sheet may contain a surface active agent. The surface active agent serves as a coating aid, a releasing agent, a slipping agent and an anti-static agent. Japanese Patent Provisional Publication Nos. 62-173463 and 62-183457 describe the surface active agent.

In place of the surface active agent, organic fluorine compounds may be used. The organic fluorine compounds preferably are hydrophobic. Examples of the compounds include fluorine-contained surface active agents, oily fluorine cord (e.g., fluorine oil), and solid fluorocarbon resins (e.g. tetrafluoroethylene resin). The organic fluorine compounds are described in Japanese Patent Publication No. 57-9053 (Column 8-17) and Japanese Patent Provisional Publication Nos. 61-20994 and 62-135826.

The layers (including a back coating layer) of the image-receiving sheet may contain a polymer latex. The polymer latex improves characteristics of the layers. For example, it gives dimensional stability, and inhibits curling, adhesion, and cracking of the layers. Japanese Patent Provisional Publication Nos. 62-245258, 62-1316648, and 62-110066 describe the polymer latex. A polymer latex having a low glass transition temperature (not higher than 40° C.) can prevent the layer containing a mordant from cracking and curling. On the other hand, a polymer latex having a high glass transition point can prevent the back coating layer from curling.

An anti-fading agent may be contained in the layers of the image-receiving sheets The "anti-fading agent" include anti-oxidizing agent, UV absorber and metal complexes. Japanese Patent Provisional Publication No. H1-161236 pp. 225–247 describes the anti-fading agent.

The image-receiving sheet may contain a fluorescent whitening dye. The whitening dye may be added in the ink.

A particularly preferred support of the image receiving sheet is a plastic film or a sheet of paper having surfaces laminated with a film of polyolefin (e.g., polyethylene, polystyrene, polyethylene terephthalate, polybutene, and copolymers thereof). Preferably, a white pigment (e.g., titanium oxide, zinc oxide) or a coloring dye (e.g., cobalt blue, ultramarine, neodymium oxide) is added into the polyolefin.

Generally, the ink-jet recording method is performed in an on-demand system or in a continuous system. As the head for ink-jet recording (i.e., jet head), bubble jet type, thermal jet type, and ultrasonic type are known.

There are some types of the ink-jet recording method. For example, in one type, many small drops of thin ink (which is often referred to as "photo-ink") are jetted out. In another type, two or more inks having the same hue but different concentrations are employed so as to improve image quality. Further, colorless and transparent ink can be used for the ink-jet recording. The present invention is particularly effective in the ink-jet recording method in which many small drops of thin ink are jetted out to print a photographic image in a high speed.

COMPARISON EXAMPLE 1

[Preparation of Aqueous Ink]

The following components were mixed and stirred for one hour, while the mixture was heated at 30° C. to 40° C. The resultant liquid was filtered under pressure through a microfilter (average pore size: 0.8 μm, diameter: 47 mm) to prepare a jet-printing aqueous ink.

| Ink Composition | |
|---|---|
| azo dye (VII, shown below) | 4 weight parts |
| diethylene glycol | 9 weight parts |
| tetraethylene glycol monobutyl ether | 9 weight parts |
| glycerol | 7 weight parts |
| diethanolamine | 1 weight parts |
| water | 70 weight parts |

(VII)

[Structure of azo dye VII: $CH_3O$-phenyl-$N=N$-naphthyl with $CH_3$-$CONH$, $HO$, $SO_3Na$, and $NaO_3S$ substituents]

[Recording and Evaluation of Image]

Using the prepared ink, an image was printed on a photo-gloss paper sheet [Ink-jet paper (super photo grade), Fuji Photo Film Co., Ltd.] and a super-fine gloss paper sheet (MJA4S3P, Seiko-Epson Co., Ltd., by means of an ink-jet printer [PM-700C, Seiko-Epson Co., Ltd].

Each printed image was evaluated from the viewpoints of hue and resistance against light.

In consideration of the fact that an absorption having a sharp peak gives a clear hue, the image was subjected to measurement for reflection spectrum using a spectrophotometer and evaluated by the following criteria: A (half width: less than 80 nm), B (half width: 80–100 nm), C (broad).

The resistance against light was estimated in the following manner. The sample image was exposed to xenon light (85,000 Lux) by means of a weather meter [Atlas C, 165] for 3 days, and then the image density was measured by means of a reflection densitometer [X-Rite 310TR] for estimating a residual amount of the dye. The dye residual amount was classified by the following criteria:

A (residual amount: more than 80%), B (residual amount: 60–80%), C (residual amount: less than 60%).

The results are set forth in Table 1.

COMPARISON EXAMPLES 2 to 5

The procedure for preparing an aqueous ink described in Comparison Example 1 was repeated using the aforementioned azomethine dye (III-5) [for Comparison Example 2], azomethine dye (IV-2) [for Comparison Example 3], azo dye (V-6) [for Comparison Example 4], or azo dye (VI-10) [for Comparison Example 5] in place of the azo dye (VII) in the same amount, to prepare a jet-printing ink. Each ink prepared had a viscosity of 5 cp at 25° C.

The procedure for recording and evaluation of image described in Comparison Example 1 was performed in the same manner for evaluating the prepared ink. The results are set forth in Table 1.

EXAMPLES 1 to 4

The procedure for preparing an aqueous ink described in Comparison Example 2, 3, 4, or 5 was repeated except for changing the amount of glycerol to 3 weight parts and incorporating 10 weight parts of the aforementioned basic polymer (A-4) [molecular weight (Mw): 15,000], to prepare a jet-printing ink of Example 1, 2, 3, or 4. Each ink prepared had a viscosity of 5 cp at 25° C.

The procedure for recording and evaluation of image described in Comparison Example 1 was performed in the same manner for evaluating the prepared ink. The results are set forth in Table 1.

EXAMPLES 5 to 8

The procedure for preparing an aqueous ink described in Comparison Example 2, 3, 4, or 5 was repeated except for changing the amount of glycerol to 5 weight parts and incorporating 10 weight parts of the aforementioned basic polymer (A-23), to prepare a jet-printing ink of Example 5, 6, 7, or 8. Each ink prepared had a viscosity of 6 cp at 25° C.

The procedure for recording and evaluation of image described in Comparison Example 1 was performed in the same manner for evaluating the prepared ink. The results are set forth in Table 1.

EXAMPLES 9 to 12

The procedure for preparing an aqueous ink described in Comparison Example 2, 3, 4, or 5 was repeated except for changing the amount of glycerol to 2 weight parts and incorporating 10 weight parts of the aforementioned basic polymer (A-24), to prepare a jet-printing ink of Example 9, 10, 11, or 12. Each ink prepared had a viscosity of 6 cp at 25° C.

The procedure for recording and evaluation of image described in Comparison Example 1 was performed in the same manner for evaluating the prepared ink. The results are set forth in Table 1.

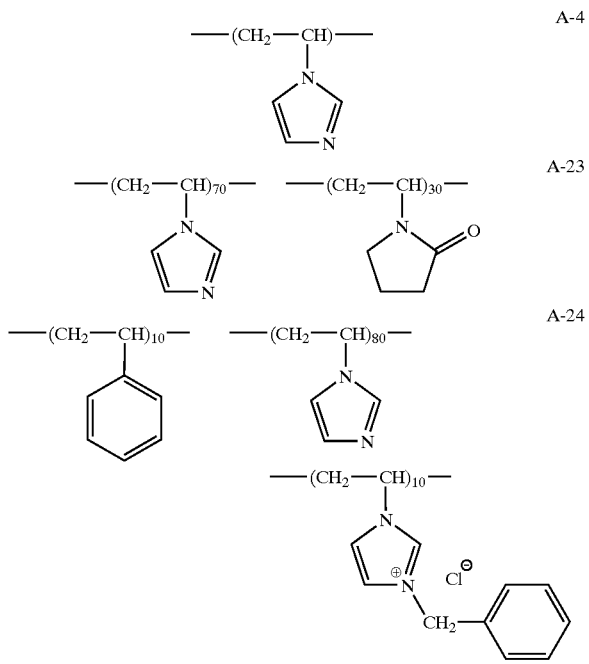

TABLE 1

| Ink | Polymer | Dye | Glycerol (wt. parts) | Vis. (cp) | Photo paper Hue | Photo paper Res. | Genuine paper Hue | Genuine paper Res. |
|---|---|---|---|---|---|---|---|---|
| \multicolumn{9}{c}{Comparison Example} |
| 1 | none | VIII | 7 | 5 | B | A–B | B–C | B–C |
| 2 | none | III-5 | 7 | 5 | A | A–B | B | C |
| 3 | none | IV-2 | 7 | 5 | A–B | A–B | B | C |
| 4 | none | V-6 | 7 | 5 | A | A–B | B | C |
| 5 | none | VI-10 | 7 | 5 | A–B | A–B | C | C |
| \multicolumn{9}{c}{Example} |
| 1 | A-4 | III-5 | 3 | 5 | A | A | A | A–B |
| 2 | A-4 | IV-2 | 3 | 5 | A–B | A | A–B | A–B |
| 3 | A-4 | V-6 | 3 | 5 | A | A | A | A–B |
| 4 | A-4 | VI-10 | 3 | 5 | A–B | A | A–B | A–B |
| 5 | A-23 | III-5 | 5 | 6 | A | A | A | A–B |
| 6 | A-23 | IV-2 | 5 | 6 | A–B | A | A–B | A–B |
| 7 | A-23 | V-6 | 5 | 6 | A | A | A | A–B |
| 8 | A-23 | VI-10 | 5 | 6 | A–B | A | A–B | A–B |
| 9 | A-24 | III-5 | 2 | 6 | A | A–B | A | B |
| 10 | A-24 | IV-2 | 2 | 6 | A–B | A–B | A–B | B |
| 11 | A-24 | V-6 | 2 | 6 | A | A–B | A | B |
| 12 | A-24 | VI-10 | 2 | 6 | A–B | A–B | A–B | B |

As is clear from the result given in Table 1, the jet-printing ink of the invention gives an image of good hue and high resistance to light in various receiving sheets. Further, the images formed of the inks of Examples 1 to 12 showed less blotting, and had good resistance in water.

What is claimed is:

1. A jet printing ink comprising a dye and an aqueous medium, which further comprises glycerol and a basic polymer having a side-chain containing 1-imidazolyl, said dye being dissolved in the aqueous medium, wherein the basic polymer is contained in an amount of 0.1 to 50 weight % and the ink has a viscosity of 50 cp or lower at 25° C., and wherein the dye is an azomethine dye of the following formula (III) or an azo dye of the following formula (V) or mixtures thereof:

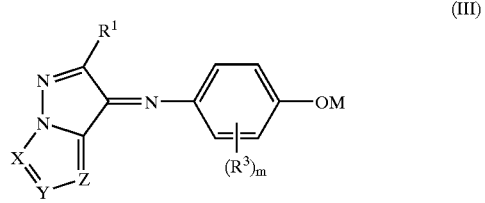

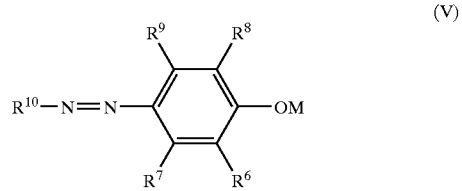

in which each of $R^1$ and $R^3$ independently is a hydrogen atom, a halogen atom, an alkyl group, a cycloalkyl group, an aralkyl group, an aryl group, a heterocyclic group, an alkoxy group, an aryloxy group, cyano, amido, sulfonamido, ureido, an alkoxycarbonylamino group, an alkylthio group, an arylthio group, an alkoxycarbonyl group, a carbamoyl group, a sulfamoyl group, a sulfonyl group, an acyl group, an amino group, or an alkylamino group; m is 0, 1, 2, 3, or 4; each of X, Y and Z independently is =N— or =CR$^2$—, in which $R^2$ is a hydrogen atom, an alkyl group, a cycloalkyl group, an aralkyl group, an aryl group, a heterocyclic group, an alkoxy group, or an aryloxy group; in the case that both of X and Y are =CR$^2$—, these two $R^2$ can be combined to form a ring; M is a hydrogen atom, a dissociated inorganic base, a primary amine, a secondary amine, or a tertiary amine; each of $R^6$, $R^7$, $R^8$ and $R^9$ independently is a hydrogen atom, a halogen atom, an alkyl group, a cycloalkyl group, an aralkyl group, an aryl group, a heterocyclic group, cyano, hydroxyl, nitro, amino, an alkylamino, an alkoxy group, an aryloxy group, amido, an arylamino group, ureido, sulfamoylamino, an alkylthio group, an alkoxycarbonyl group, a heterocyclic ring-oxy group, an azo group, an acyloxy group, a carbamoyloxy group, a silyloxy group, an aryloxycarbonyl group, an aryloxycarbonylamino group, an imido group, a heterocyclic ring-thio group, sulfinyl, phosphoryl, an acyl group, carboxyl or sulfo; otherwise $R^8$ and $R^9$ are combined to form an aromatic ring or a heterocyclic ring; and $R^{10}$ is an unsaturated heterocyclic ring.

2. The jet printing ink of claim 1, wherein the basic polymer has a molecular weight in the range of 1,000 to 100,000.

3. The jet printing ink of claim 1, wherein glycerol is contained in an amount of 2 to 5 weight %.

4. The jet printing ink of claim 1, wherein the dye is contained in an amount of 0.1 to 30 weight %.

5. A method of forming an ink image on a receiving sheet using an ink jet printer, which comprises jetting drops of an ink comprising a dye and an aqueous medium which further comprises glycerol and a basic polymer having a side-chain containing 1-imidazolyl, said dye being dissolved in the aqueous medium, wherein the basic polymer is contained in an amount of 0.1 to 50 weight %, and the ink has a viscosity of 50 cp or lower at 25° C., and wherein the dye is an azomethine dye of the following formula (III) or an azo dye of the following formula (V) or mixtures thereof:

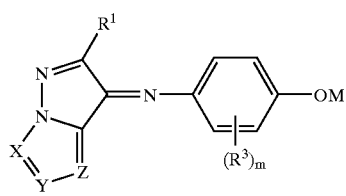

(III)

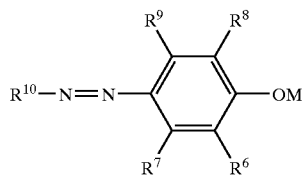

(V)

in which each of $R^1$ and $R^3$ independently is a hydrogen atom, a halogen atom, an alkyl group, a cycloalkyl group, an aralkyl group, an aryl group, a heterocyclic group, an alkoxy group, an aryloxy group, cyano, amido, sulfonamido, ureido, an alkoxycarbonylamino group, an alkylthio group, an arylthio group, an alkoxycarbonyl group, a carbamoyl group, a sulfamoyl group, a sulfonyl group, an acyl group, an amino group, or an alkylamino group; m is 0, 1, 2, 3, or 4; each of X, Y and Z independently is =N— or =$CR^2$—, in which $R^2$ is a hydrogen atom, an alkyl group, a cycloalkyl group, an aralkyl group, an aryl group, a heterocyclic group, an alkoxy group, or an aryloxy group; in the case that both of X and Y are =$CR^2$—, these two $R^2$ can be combined to form a ring; M is a hydrogen atom, a dissociated inorganic base, a primary amine, a secondary amine, or a tertiary amine; each of $R^6$, $R^7$, $R^8$ and $R^9$ independently is a hydrogen atom, a halogen atom, an alkyl group, a cycloalkyl group, an aralkyl group, an aryl group, a heterocyclic group, cyano, hydroxyl, nitro, amino, an alkylamino, an alkoxy group, an aryloxy group, amido, an arylamino group, ureido, sulfamoylamino, an alkylthio group, an alkoxycarbonyl group, a heterocyclic ring-oxy group, an azo group, an acyloxy group, a carbamoyloxy group, a silyloxy group, an aryloxycarbonyl group, an aryloxycarbonylamino group, an imido group, a heterocyclic ring-thio group, sulfinyl, phosphoryl, an acyl group, carboxyl or sulfo; otherwise $R^8$ and $R^9$ are combined to form an aromatic ring or a heterocyclic ring; and $R^{10}$ is an unsaturated heterocyclic ring.

6. The method of claim 5, wherein the dye is contained in the ink in an amount of 0.1 to 30 weight %.

* * * * *